Patented Dec. 24, 1935

2,025,655

UNITED STATES PATENT OFFICE 2,025,655

PHARMACEUTICAL PREPARATION AND DENTIFRICE

Benjamin Rice Faunce, Riverside, N. J.

No Drawing. Application May 14, 1930,
Serial No. 452,523

13 Claims. (Cl. 167—93)

This invention relates to improvements in pharmaceutical preparations.

The primary object of the invention is the provision of a medicinal product which consists of the proper combination and treatment of animal bile and glycerine in a manner which will most efficiently render the same capable of wide use, either by itself or in combination with other vehicles, bases, and excipients capable of acting as a prophylactic pus solvent, anti-congestive, or as an analgesic.

Other objects and advantages of this invention will be apparent throughout the following detailed description.

As a typical instance of the process by which the improved composition of matter is prepared, I take bile, preferably from some animal such as the steer, and as soon as convenient after extraction, and without alteration from its natural condition mix it with glycerine (standard U. S. P.). The bile and glycerine are mixed in substantially equal proportions. I prefer to take 4 fluid ounces of bile or ox gall, and 4 fluid ounces of glycerine, mix them together as above mentioned, and place them in a suitable container wherein fermentation may take place under the best circumstances. The container is preferably plugged with absorbent cotton. The glycerine and bile are permitted to stand for a period of time approximating three months, at a temperature of from substantially 70° F. to 80° F., or until the apparent fermentation has ended.

At this time it appears to me that by fermentation the bacteria that have been produced have either consumed the feeding nutriment or created some opposing factor which ends the apparent fermentation. I consider it necessary, although probably not essential in all circumstances, to permit this reaction to take place, since if the glyceride of bile were to be used for medicinal purposes prior to seasoning, harm might result in some instances.

I regard the use of bile and glycerine in equal proportions as substantially essential within those approximate limits, since a 50% glycerine mixture with bile seems to maintain or preserve the virtue of bile, probably due to the antiseptic value of glycerine. I do not wish to be misunderstood in this respect, for I have discovered that the use of miscellaneous antiseptics with the bile has proven detrimental in obtaining results. As another instance the use of glycerine in appreciably greater proportions than 50% will so preserve the bile that there will be practically no fermentative action, so that bacterial contamination will not be as effectively removed. The proportions must be such that during the fermentation period the valuable cocci destroying constituents of the bile will not be destroyed, and yet the mixture placed in such condition that the harmful pathogenic bacteria growths may be efficiently removed.

After the seasoning period, I separate the glyceride of bile liquid from the insoluble materials, which usually are the precipitate or heavier constituents, by first filtering through washed powdered talc, preferably supported upon conventional filtering paper. The fluid is then again filtered through a bacterial filter of any approved type, although I prefer to use an asbestos composition disc for this purpose. This removes the pathogenic matter, such as live and dead bacterial cells. Thereafter the glyceride of bile is sterilized by heat treatment preferably by subjection to a temperature of 220° F.

The product prepared as above described may be used without addition of materials thereto, or may be embodied in various forms and preparations such as mixing with an inert substance— such as talc or zinc oxide. I have found that it may be embodied with other suitable ingredients to provide a dentifrice preferably in paste form with extremely beneficial results to those who use it.

In the preparation of a toothpaste I take the glyceride of bile as above prepared, which amounts to substantially eight fluid ounces, and combine it with sufficient glycerine to make thirty-two fluid ounces. If it is desired, the glyceride of bile may be used with some other excipient or massing agent, and in the art relating to dentifrices among such excipients may be found honey, simple syrup, glyceride of starch, and a glyceride-gelatin composition, to give the dentifrice the proper consistence. However, I prefer to use glycerine sufficient in amount, which with the above prepared glyceride of bile will make thirty-two fluid ounces. Thereafter I prefer to use precipitated chalk or some other base vehicle sufficient to give the resulting mass a characteristic paste form. In the proportion of ingredients above mentioned I preferably use three and one-half pounds of precipitated chalk. Thereafter flavoring may be added to suit, and I have found that small portions of peppermint and wintergreen will give the proper flavor, although other flavors may be used if desired.

The base ingredient, precipitated chalk, has the normal function of operating as a cleansing and polishing agent, and it may be assisted in this respect by other cleansing agents such as prepared and amorphous chalk, sugar of milk, and kieselguhr or other white or light colored clays.

It is my discovery that the improved dentifrice, due to the glyceride of bile composition admixed therewith, will tend to reduce congestion; it acts as a prophylactic, thereby relieving the distresses incident to pyorrhea; its use upon the teeth regularly will prevent the formation of tartar, and I have found that its use by individuals having loose teeth, where the conditions are not too far advanced, will result in the tightening of the teeth. The use of the dentifrice is an aid in preventing bleeding gums, and in one instance its use has resulted in the reduction of a calcareous formation of the gums of a patient that had existed prior to its use for a period of from twelve to fifteen years. The improved dentifrice will cure halitosis, where the gums and teeth are at fault, if used regularly.

I have noted that the use of the improved dentifrice has a very noticeable function in maintaining the bristles of toothbrushes clean and sanitary. This is no doubt due to the fact that bile is a cleaner. Toothbrushes after a period of time appear to become dirty, especially at the base of the bristle head. This is not due so much to the collection of dirt, as it is due to the occurrence of a fungous growth that forms in the presence of dampness and organic matter. The improved dentifrice prevents this, as well as preventing the harboring of other forms of bacterial life. The maintenance of the toothbrush in sanitary condition is essential, since it is clear that the use of an implement which is bacterially infected for the purpose of rubbing or scratching the fine edge of the connecting tissues that adheres to the teeth is extremely undesirable. Due also to the cleaning action of bile, tarnish upon gold and silver fillings and bridgework is readily removed.

Various changes in the ingredients of the improved preparation, the proportions thereof, and the steps used to produce the same, may be made to the disclosure herein, without departing from the spirit of the invention or the scope of the claims.

I claim:

1. The process of preparing a medicinal composition which consists in mixing animal bile and glycerine in substantially equal proportions, permitting the same to stand for a sufficient length of time until fermentation has substantially run its course, removing the undesirable cellular and pathogenic bacterial matter from the glyceride of bile, and subsequently sterilizing the fluid glyceride of bile.

2. The process of preparing a medicinal composition which consists in mixing animal bile and glycerine in substantially equal proportions, permitting the same to stand for a sufficient length of time until fermentation has substantially run its course, filtering the undesirable cellular and pathogenic bacterial matter from the glyceride of bile, subsequently sterilizing the fluid glyceride of bile, and mixing therewith additional glycerine.

3. The process of preparing a dentifrice which consists in mixing animal bile and glycerine in substantially equal proportions, permitting the same to stand for a sufficient length of time until fermentation has substantially run its course, filtering the undesirable cellular and pathogenic bacterial matter from the glyceride of bile, subsequently sterilizing the fluid glyceride of bile, mixing therewith a suitable excipient, and a cleansing and polishing agent.

4. In a dentifrice, sterilized glyceride of bile freed of pathogenic bacterial matter admixed substantially of equal proportion of glycerine and bile, an excipient, and a suitable cleansing and polishing agent.

5. The process of providing a dentifrice which consists in taking fresh ox-gall and glycerine in substantially equal proportions, admixing them and permitting them to stand until fermentation has substantially ended, filtering therefrom cellular, solid and pathogenic bacterial matter, and adding therewith a massing agent and a cleansing and polishing agent with flavor to suit.

6. The process of manufacturing a toothpaste which consists in mixing fresh ox-gall and glycerine in substantially equal proportions, permitting the same to stand at a temperature of from 70° F. to 80° F. until the period of fermentation has substantially ended, filtering and removing cellular and pathogenic bacterial matter, adding to the residue glyceride of bile an amount of glycerine substantially three times the amount by weight of the glyceride of bile, and adding suitable flavoring and a polishing agent.

7. The process of preparing a dentifrice which consists in mixing fresh ox-gall and glycerine in substantially equal amounts to provide substantially eight fluid ounces, permitting the mixture to stand at a normal temperature for a period of time sufficient to ferment, after fermentation removing the cellular and pathogenic bacterial matter, sterilizing the glyceride of bile residue, adding glycerine thereto in amount sufficient to make thirty-two fluid ounces, and adding powdered talc suitable to make a paste.

8. A dentifrice paste comprising a bacterially filtered glyceride of bile wherein the glycerine and bile are of substantially equal proportions, a massing agent of glycerine in substantially three times the amount of the glyceride of bile, and a cleansing and polishing agent.

9. Glyceride of bile consisting of glycerine and bile mixed in substantially equal proportions, the bile having pathogenic matter removed therefrom.

10. A remedial product for the treatment of infections consisting of bile and glycerine added in substantially equal proportions, the bile having pathogenic matter removed therefrom, said substances being mixed into paste form with an inert carrier.

11. The process of preparing a remedial product which consists in mixing glycerine and bile in substantially equal proportions, permitting fermentation to take place without destroying the valuable cocci destroying constituents of the bile, and subsequently treating the mixture for removal of pathogenic bacterial growths.

12. The process of preparing a remedial medicine for destroying pus forming bacteria consisting of taking animal bile in its natural condition, mixing therewith glycerine in substantially an equal amount, and subsequently treating the mixture for removal of harmful pathogenic bacteria from the bile.

13. In the process of preparing a remedial product the steps which consist in adding glycerine to bile in substantially equal proportions, removing the heavier constituents of the bile, and subsequently treating the product for the removal of pathogenic bacteria.

BENJAMIN RICE FAUNCE.